May 28, 1957 — R. J. ESPOSITO — 2,793,466
GARFISH TRAPPING SNARE
Filed Sept. 12, 1956
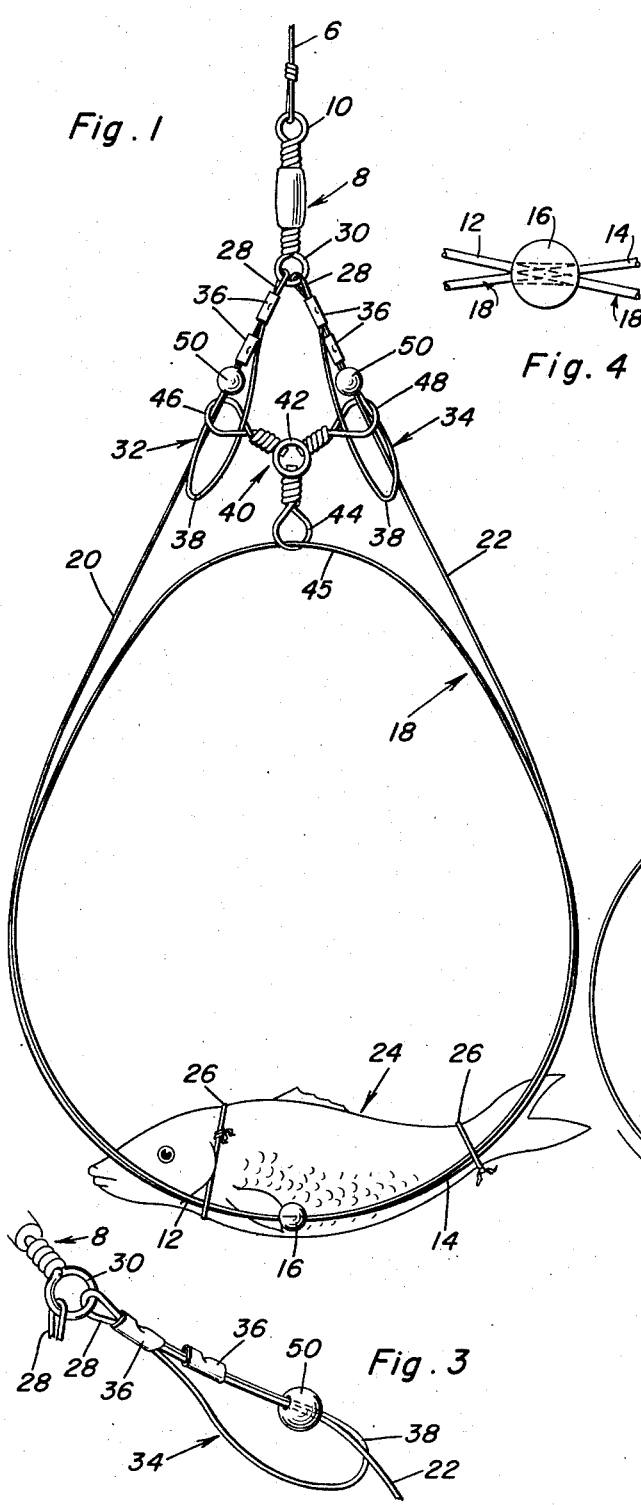
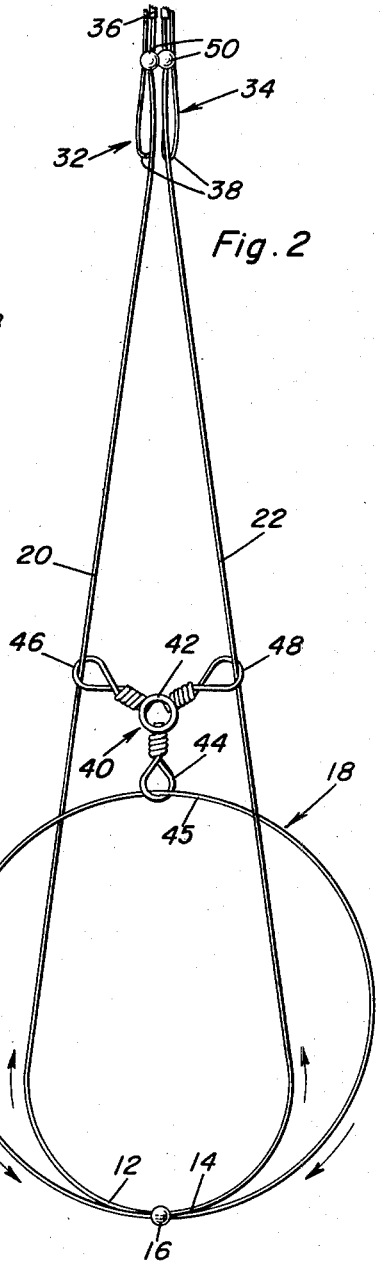
Ralph J. Esposito
INVENTOR.

United States Patent Office 2,793,466
Patented May 28, 1957

2,793,466
GARFISH TRAPPING SNARE

Ralph J. Esposito, New Orleans, La.

Application September 12, 1956, Serial No. 609,448

7 Claims. (Cl. 43—87)

The present invention relates to novel fishing tackle which is expressly, but not necessarily, designed and adapted to trap and land a garfish and has reference, more particularly, to a snare which is constructed from a length of resilient wire fashioned into a rink-like noose which is adapted to encircle and forcibly close around the snout of the garfish.

An object of the invention is to provide a simple, practical and effectively usable snare characterized by the aforementioned noose and complemental means whereby the noose is easily baited and which functions, when a strike is made, to satisfactorily trap the victim.

Briefly, the invention in its preferred embodiment comprises an openable and closeable noose constructed from bendably resilient wire. Median portions of the wire are passed slidingly through and beyond an opening in a noose shaping and forming bead in a manner which serves to transform the bight and adjacent bent portions of the wire into a running noose. The portions of the wire beyond the respective ends of the bead are bent and bowed lengthwise and define tethering elements. The tethering elements converge upwardly and are connected at their upper ends to a single swivel on the lower end of a fishing line. The terminal portions of the wire-ends are then bent upon themselves and fashioned into a pair of outwardly and downwardly diverging loops. The loops are expansible and contractible and serve as retaining members. A spider-like noose holding and setting device is provided. This is preferably a three-way swivel and has a hub or collar carrying circumferentially spaced swivelling eyes, one eye being slidably and operatively connected to the bight portion of the noose, the other two eyes functioning as keepers having embracing and sliding connection wtih their respective retaining members and being released from the latter to permit the noose to close when the fish, upon taking the bait, exerts the necessary pull on the noose and tethering elements, causing the noose to perform its encircling and trapping function.

Other objects, features and advantages will become readily apparent from the following description of the details and the invention as claimed.

In the drawing:

Fig. 1 is an elevational view showing the snare baited, set, and ready to function;

Fig. 2 is an elevational view illustrating the relationship of parts after the bait has been taken and the catch has been presumably made; and Fig. 3 is a fragmentary perspective view on a slightly enlarged scale showing the construction of one of the retaining members or loops Fig. 4 is an enlarged fragmentary view showing a bead and wire portions of a noose extending through the hole in said bead.

Referring now to the drawings and particularly Fig. 1, the fishing line is denoted by the numeral 6 and the single swivel 8 attached to the lower end of the line as at 10. The noose-forming and snaring means is characterized primarily by a single length of springy or resilient wire. This wire is bent upon itself intermediate its respective ends and intermediate or median portions 12 and 14 of the wire are passed in opposite directions (left and right) through the opening in a noose forming bead or an equivalent sleeve-like element 16. The bight portion of the wire is thus transformed or fashioned into a ring-like loop which is here designated as an openable and closable noose 18. The intermediate and end portions of the wire are then directed upwardly and converge toward each other and may be said to be bent or bowed to provide upwardly converging reaches or tethering elements 20 and 22. The portions of the tethering elements and also the noose adjacent to the bead 16 may be bent into close proximity with each other in the manner shown in Fig. 1 to provide satisfactory baiting of the noose. The bait 24 comprises a small fish and this is tied with pieces of twine or the like 26 in readiness to make the catch as is evidenced from the drawing. The converging upper ends of the tethering elements are bent upon themselves and fashioned into return bends defining eyes 28 and these are connected with the lower eye 30 on the swivel. The terminal portions of the wire are bent upon themselves to provide a pair of outwardly and downwardly diverging elongate loops 32 and 34 which are here referred to broadly as retaining members. The cooperating wire portions are connected by suitable clips 36 as shown for example in Fig. 3. The leading or lower end portions of the loops are slightly pointed as at 38 so that they may be threaded or conveniently passed through cooperating releasable pull actuated means 40. Specifically this comprises a three-way swivel and embodies a collar-like hub 42 having circumferentially spaced swivelly connected eyes attached thereto. The lowermost eye in Fig. 1, denoted at 44 is slidingly and operatively connected with the bight portion 45 of the noose. The other two eyes, called keeper eyes and denoted at 46 and 48, are slidingly and releasably connected with the loop-like retaining members 32 and 34 in the manner shown in Fig. 1. These retaining members, as is obvious, are expansible and contractible and are such in size that when they are passed through the eyes 46 and 48 the loops are slightly compressed and the inherent resilient properties of the limbs thereof forces the limbs into binding contact with the cooperating portions of the eyes thus causing the eyes 46 and 48 to stay put when placed by hand in the set position seen in Fig. 1. It is to be noticed too that the eyes 46 and 48 also slidingly embrace the cooperating portions of the tethering elements 20 and 22. In order to prevent the retaining loops or members 32 and 34 from getting out of place or spreading apart additional beads 50 are provided and these slidingly embrace the outer limbs of the loops and also the adjacent portions of the tethering elements. Thus, the beads anchor the retaining members 32 and 34 in opposed properly positioned relationship so that they will not swing too close together or too far apart and interfere with the release of the eyes 46 and 48 therefrom when the pull of the garfish is exerted on the bait.

It will be evident from the drawings that the trap or snare is set in the manner shown in Fig. 1. With the bait 24 in tied position and the spider-like swivel 40 in its up position and releasably connected with the retaining members the noose 18 is held open and in readiness to make the catch. When a strike is made and the attending pull is exerted on what may be called the lower portion of the noose, the noose quickly contracts, releases the means 40 allowing the eyes 46 and 48 to slide along the tethering elements 20 and 22 resulting in the trapping relationship of the parts seen in Fig. 2.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in trapping a garfish, a snare constructed from a length of wire and comprising a rink-like noose adapted to encircle and forcibly close around the snout of said garfish, a fishing line, a swivel attached to the lower end of said line, a freely movable noose-forming bead, the opposite end portions of said noose being threaded slidingly in opposite directions through the opening in said bead and having their terminal portions secured to said swivel, pull actuated means operatively connected to a portion of said noose and slidingly connected to the respective end portions of said noose, and retaining members for said pull actuated means connected to said end portions and also to said swivel, said means being releasably connected to said retaining members and serving to set the noose and hold it in an open position.

2. The structure defined in claim 1 and wherein said means comprises a spider-like three-way swivel located between said end portions in a position substantially diametrically opposite to said noose-forming bead and embodying a hub-collar carrying three circumferentially arranged swivelly attached eyes, one eye slidingly connected with the bight portion of said noose, and the other eyes constituting keepers and having sliding connection with the aforementioned end portions of the wire and also having sliding and releasable connection with said retaining members.

3. The structure defined in claim 2 and wherein said retaining members comprise elongated expansible and contractible resilient wire loops which, embraced by said keeper eyes, are temporarily contracted in a manner to yieldingly and frictionally retain said keeper eyes in their set ready-to-release position on said retaining members.

4. A snare for trapping a garfish comprising a fishing line, a pair of oppositely arranged outwardly and downwardly diverging retaining members connected to the lower end of said line, a length of flexibly resilient wire having its intermediate portion bent and fashioned into a given shape-sustaining but free running noose adapted to carry the bait and, when contracted closes around and binds the victim's snout, the end portions of said wire being fastened to the lower end of said line, and pull actuated means having operative connection with a portion of said noose and releasably connected with said retaining members.

5. The structure defined in claim 4 and wherein said means comprises a spider-like three-way swivel located between said end portions in a position substantially diametrically opposite to said noose-forming bead and embodying a hub-collar carrying three circumferentially arranged swivelly attached eyes, one eye slidingly connected with the bight portion of said noose, and the other eyes constituting keepers and having sliding connection with the aforementioned end portions of the wire and also having sliding and releasable connection with said retaining members.

6. The structure defined in claim 5 and wherein said retaining members comprise elongated expansible and contractible resilient wire loops which embraced by said keeper eyes are temporarily contracted in a manner to yieldingly and frictionally retain said keeper eyes in their set ready-to-release position on said retaining members, and beads slidingly connected to said wire loops and adjacent cooperating portions of the end portions of said wire.

7. A snare for trapping a garfish comprising a fishing line, a single-type swivel attached to the lower end of said fishing line, a length of bendably resilient wire bent between its ends, a noose-forming bead, median portions of said wire being passed slidingly through and beyond the opening in said bead whereby the bight portion of said wire is transformed into a running noose which is adapted, when it is tautened, to encircle and close tightly around the snout of the garfish, the portions of said wire beyond the respective ends of said bead being bent and bowed lengthwise and defining tethering elements, the latter converging upwardly and being connected at their upper ends to said swivel, the terminal portions of the wire-ends being bent upon themselves and fashioned to a pair of outwardly and downwardly diverging expansible and contractible loops and said loops constituting retaining members and having slidable beads thereon slidingly connected with adjacent portions of said tethering elements whereby the loops are properly held in their intended operating positions, and spider-like noose-holding and setting means comprising a three-way swivel having a hub-collar carrying three circumferentially arranged eyes, one eye being slidingly and operatively connected to the bight portion of said noose, the other two eyes functioning as keepers and having embracing and sliding connection with their respective retaining members and adjacent cooperating portions of said tethering elements.

No references cited.